(12) United States Patent
Peng

(10) Patent No.: US 10,638,199 B2
(45) Date of Patent: Apr. 28, 2020

(54) INFORMATION PROCESSING METHOD, TERMINAL AND SERVER

(71) Applicant: Tencent Technology (Shenzhen) Company Limited, Shenzhen, Guangdong (CN)

(72) Inventor: Ao Peng, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 36 days.

(21) Appl. No.: 15/708,778

(22) Filed: Sep. 19, 2017

(65) Prior Publication Data

US 2018/0007442 A1 Jan. 4, 2018

Related U.S. Application Data

(63) Continuation of application No. PCT/CN2016/079624, filed on Apr. 19, 2016.

(30) Foreign Application Priority Data

Aug. 20, 2015 (CN) .......................... 2015 1 0516445

(51) Int. Cl.
*H04N 21/4788* (2011.01)
*G06Q 20/12* (2012.01)
(Continued)

(52) U.S. Cl.
CPC ......... *H04N 21/4788* (2013.01); *G06Q 20/02* (2013.01); *G06Q 20/123* (2013.01);
(Continued)

(58) Field of Classification Search
CPC ............... H04N 7/163; H04N 21/4532; H04N 21/4751; H04N 21/4753; H04N 5/44543
See application file for complete search history.

(56) References Cited

U.S. PATENT DOCUMENTS 9,015,778 B2  4/2015  Roberts
2011/0109648 A1*  5/2011  Roberts ............ H04N 21/44222
(Continued)

FOREIGN PATENT DOCUMENTS

| CN | 104244103 A | 12/2014 |
|---|---|---|
| CN | 104602131 A | 5/2015 |
| CN | 104618813 A | 5/2015 |
| CN | 104754396 A | 7/2015 |
| KR | 20060031671 A | 4/2006 |

OTHER PUBLICATIONS

International Search Report in international application No. PCT/CN2016/079624, dated Jul. 21, 2016.
(Continued)

*Primary Examiner* — Anthony Bantamoi
(74) *Attorney, Agent, or Firm* — Brinks Gilson & Lione

(57) ABSTRACT

An information processing method, a terminal and a server are disclosed. The method includes that: a terminal acquires a first input operation, acquires first input information and first comment information based on the first input operation, and sends the first input information and the first comment information to a server, the first input information includes first data; and if determining that a condition is met, the terminal outputs second comment information sent by the server, the second comment information is the first comment information displayed in a specific display manner.

12 Claims, 13 Drawing Sheets

(51) Int. Cl.
  *G06Q 20/02*  (2012.01)
  *G06Q 20/34*  (2012.01)
  *G06Q 30/08*  (2012.01)
  *H04N 21/235*  (2011.01)
  *H04N 21/239*  (2011.01)
  *H04N 21/262*  (2011.01)
  *H04N 21/437*  (2011.01)
  *H04N 21/81*  (2011.01)

(52) U.S. Cl.
  CPC ............ *G06Q 20/34* (2013.01); *G06Q 30/08* (2013.01); *H04N 21/235* (2013.01); *H04N 21/239* (2013.01); *H04N 21/26225* (2013.01); *H04N 21/437* (2013.01); *H04N 21/8126* (2013.01)

(56) References Cited

U.S. PATENT DOCUMENTS

| | | |
|---|---|---|
| 2011/0119694 A1 | 5/2011 | Roberts |
| 2012/0192220 A1* | 7/2012 | Wyatt .................... H04N 7/163 |
| | | 725/30 |
| 2015/0181297 A1 | 6/2015 | Roberts et al. |
| 2017/0251240 A1 | 8/2017 | Peng |

OTHER PUBLICATIONS

Notification of the First Office Action of Korean application No. 10-2017-7029868, dated Nov. 1, 2018.

\* cited by examiner

INFORMATION PROCESSING METHOD, TERMINAL AND SERVER

CROSS-REFERENCE TO RELATED APPLICATIONS

This is a continuation application of International Patent Application No. PCT/CN2016/079624 filed on Apr. 19, 2016, which claims priority of Chinese Application No. 201510516445.X, filed on Aug. 20, 2015. The disclosures of these applications are hereby incorporated by reference in their entirety.

TECHNICAL FIELD

The disclosure relates to an information processing technology, and in particular to an information processing method, a terminal and a server.

BACKGROUND

For enabling users to interact with each other when watching a same video, a video bullet screen technology has been proposed. The video bullet screen refers to comments directly displayed over a video. A user may make a bullet screen comment at the same time of watching a video. The bullet screen comment may be displayed over a video frame in a sliding caption form. In such a manner, the user may watch bullet screen comments made by others at the same time of watching the video, and may also make his/her own bullet screen comment for the others to read, thereby forming a real-time interaction experience and adding pleasure in video watching.

Typically, for a certain video, all bullet screen comments have a similar display effect, and when a large number of users make bullet screen comments, it is very difficult to rapidly focus on a certain bullet screen comment without careful observation.

SUMMARY

In at least some of the embodiments of the disclosure provide an information processing method, a terminal and a server, which are capable of highlight a certain comment to make a display effect of the bullet screen comment visually different from other bullet screen comments, enriching comment display manners and improving user experiences.

An embodiment of the disclosure provides an information processing method, which may be applied in a first terminal, the method includes: the first terminal acquires a first input operation, acquires first input information and first comment information based on the first input operation, and sends the first input information and the first comment information to a server, the first input information including first data; determines if a condition is met, if it is determined that the condition is met, second comment information sent by the server is output, the second comment information being the first comment information displayed in a specific display manner.

An embodiment of the disclosure provides an information processing method, which may be applied in a server, the method includes: the server acquires first input information and first comment information sent by a first terminal, and identifies first data in the first input information; it is determined that a condition is met if determining that a value of the first data is higher than a value of second pre-stored data and payment based on the first data is successful; generates, according to a specific display parameter, second comment information based on the first comment information; and controls the second comment information to be output to at least one terminal including the first terminal.

An embodiment of the disclosure provides a first terminal. The first terminal may include a processor and a memory storing instructions, which, when executed by the processor, cause the processor to perform an information processing method. The method includes steps of acquiring a first input operation; acquiring first input information and first comment information based on the first input operation; sending the first input information and the first comment information to a server, the first input information comprising first data; determining if a condition is met; and if determining that the condition is met, outputting second comment information sent by the server, the second comment information being the first comment information displayed in a specific display manner.

An embodiment of the disclosure provides a server may include a processor and a memory storing instructions, which, when executed by the processor, cause the processor to perform an information processing method. The method includes steps of acquiring third input information and third comment information sent by a second terminal; when determining that a value of third data in the third input information is higher than the value of the first data in the first input information input by the first terminal, generating, according to a specific display parameter, fourth comment information based on the third comment information to replace the second comment information; and sending indication information to the at least one terminal, wherein the indication information indicates that the second comment information is updated with the fourth comment information.

According to the information processing method, terminal and server provided by the embodiments of the disclosure, the terminal acquires the first input operation, acquires the first input information and the first comment information based on the first input operation, and sends the first input information and the first comment information to the server, the first input information including the first data; and if it is determined that the condition is met, the second comment information sent by the server is output, the second comment information being the first comment information displayed in the specific display manner. In such a manner, with adoption of the technical solutions of the embodiments of the disclosure, a piece of bullet screen comment information is selected as broadcast bullet screen comment information through a bidding mechanism, and the broadcast bullet screen comment information is displayed in the specific display manner. Therefore, on one hand, the broadcast bullet screen comment information is distinguished from other bullet screen comment information, comment display manners are enriched, and the information is more distinct; and on the other hand, a special identity of a user is highlighted, the user requirement is met, and user experiences are greatly improved.

DETAILED DESCRIPTION

The disclosure will be further described below in detail with reference to the drawings and specific embodiments.

Figure 1:
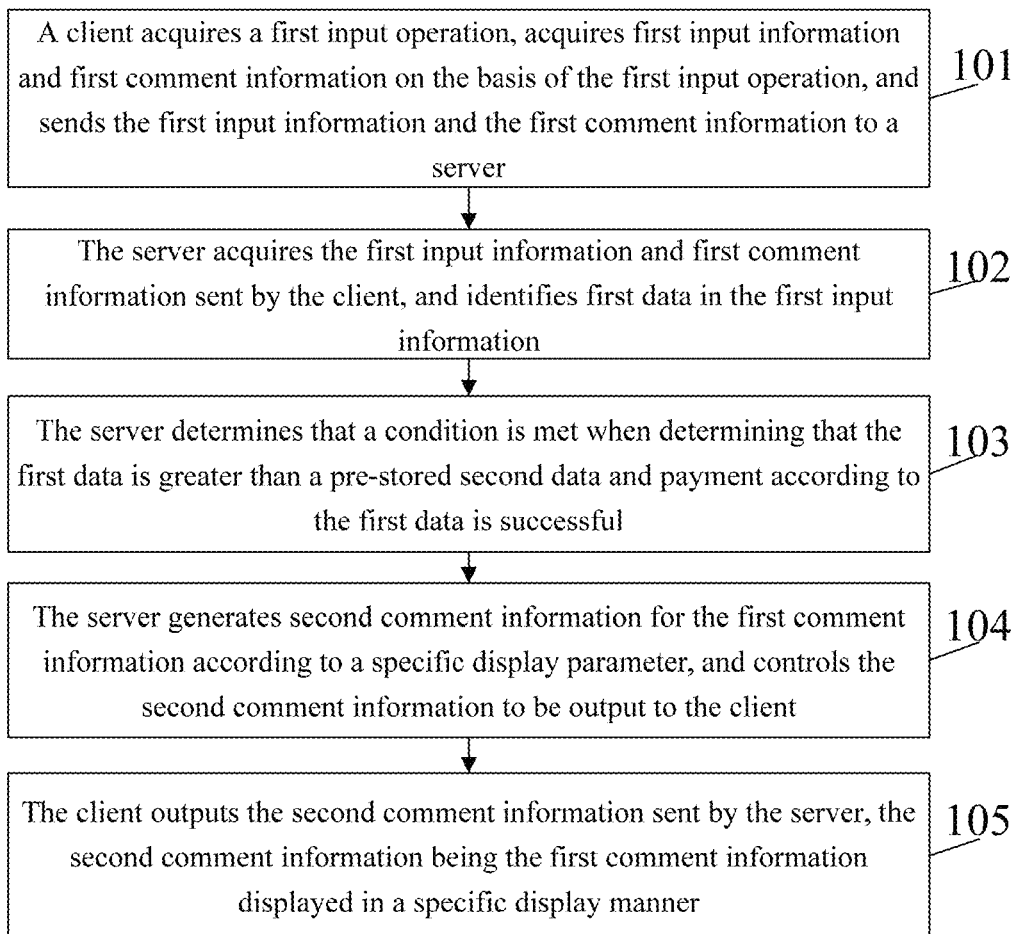
FIG. 1 is a flowchart of an information processing method according to an embodiment of the disclosure.

An embodiment of the disclosure provides an information processing method. FIG. 1 is a flowchart of an information processing method according to the embodiment of the disclosure. The method may be applied in a terminal, and particularly, executed by an application client installed in the terminal. As shown in FIG. 1, the method includes the following steps.

In Step 101, the client acquires a first input operation, acquires first input information and first comment information based on the first input operation, and sends the first input information and the first comment information to a server, the first input information including first data.

Figure 2A:
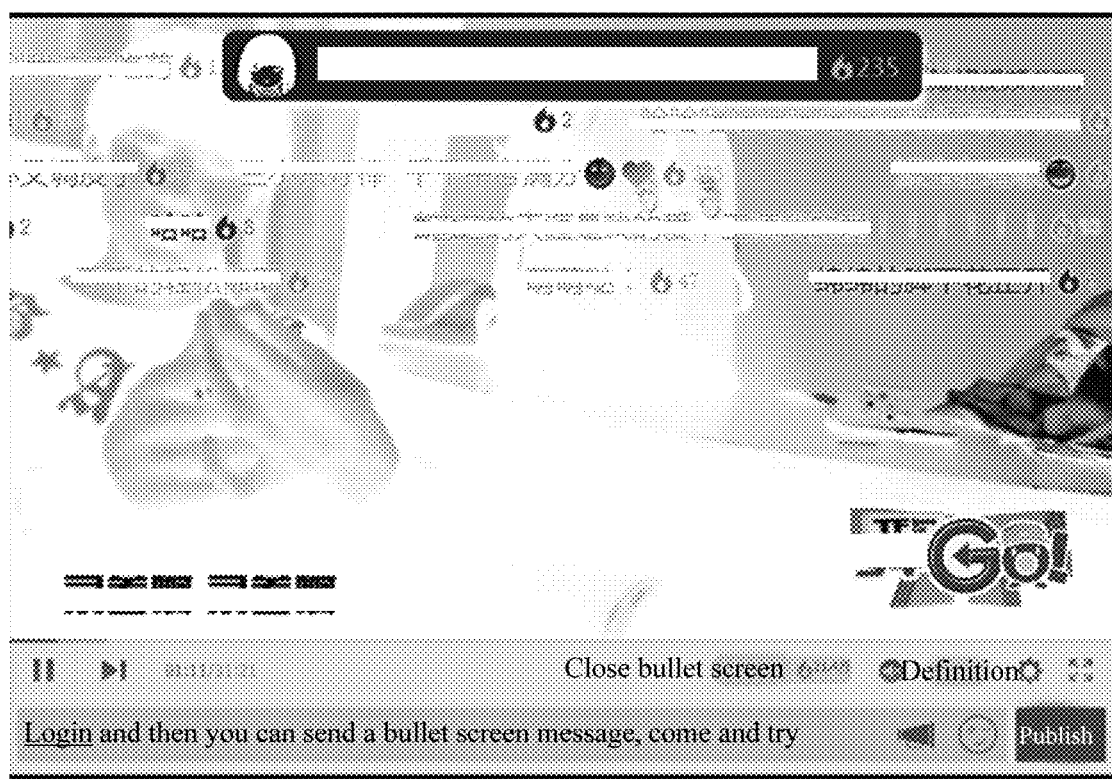
FIGS. 2a, 2b, 2c, 2d, 2e and 2f are schematic diagrams of application scenarios of a client according to an embodiment of the disclosure.
Figure 2B:
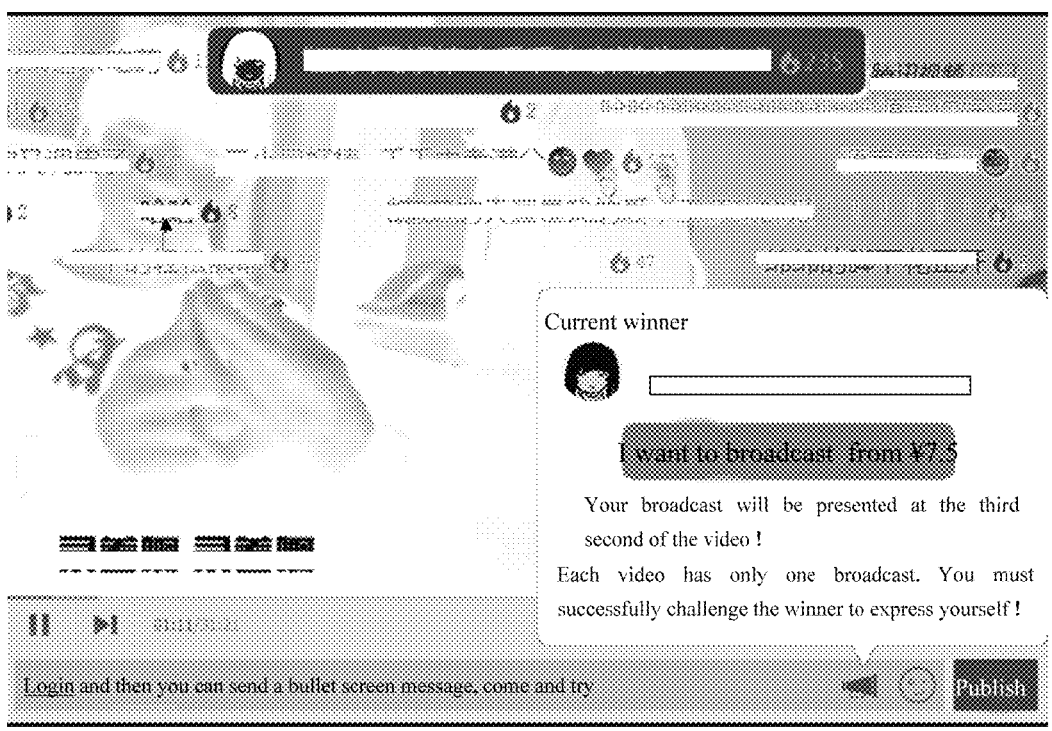
Figure 2C:
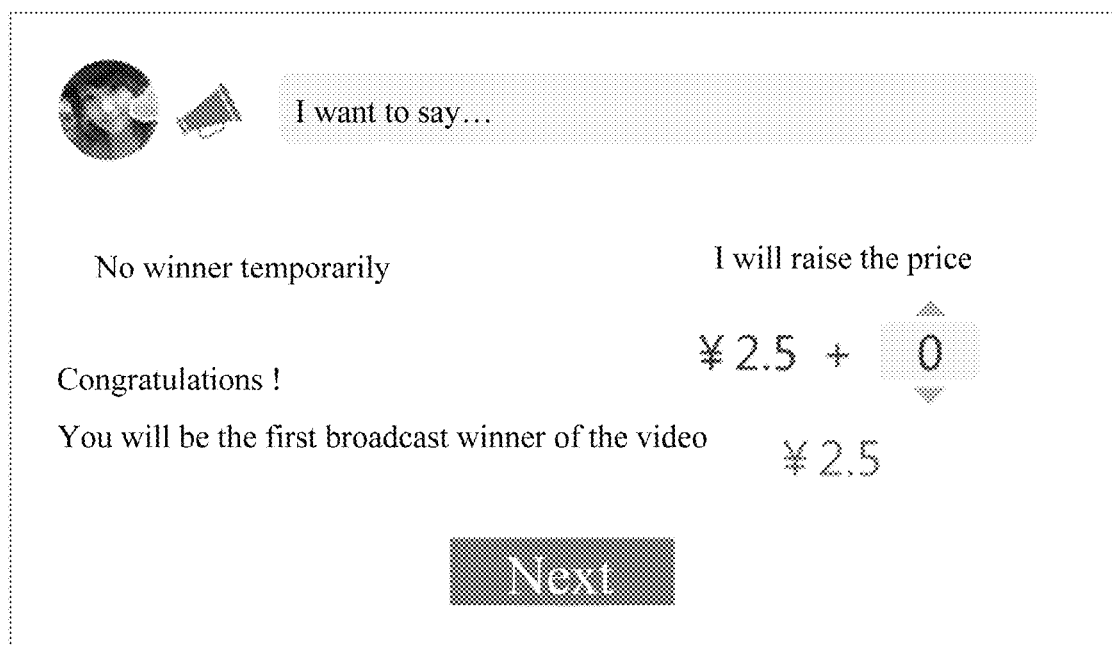
Figure 2D:
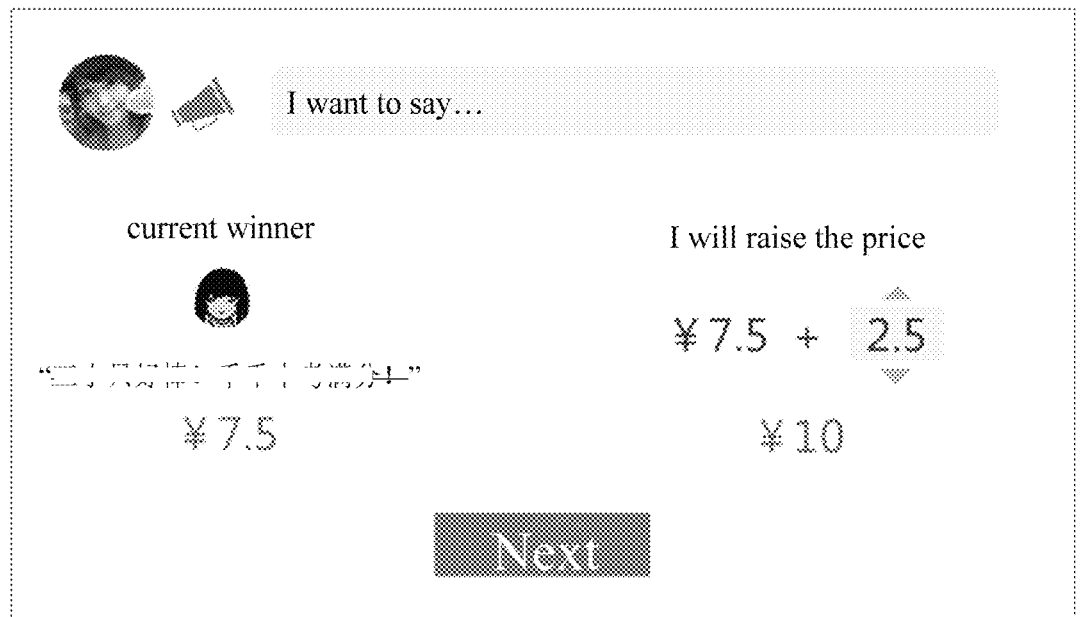
Figure 2E:
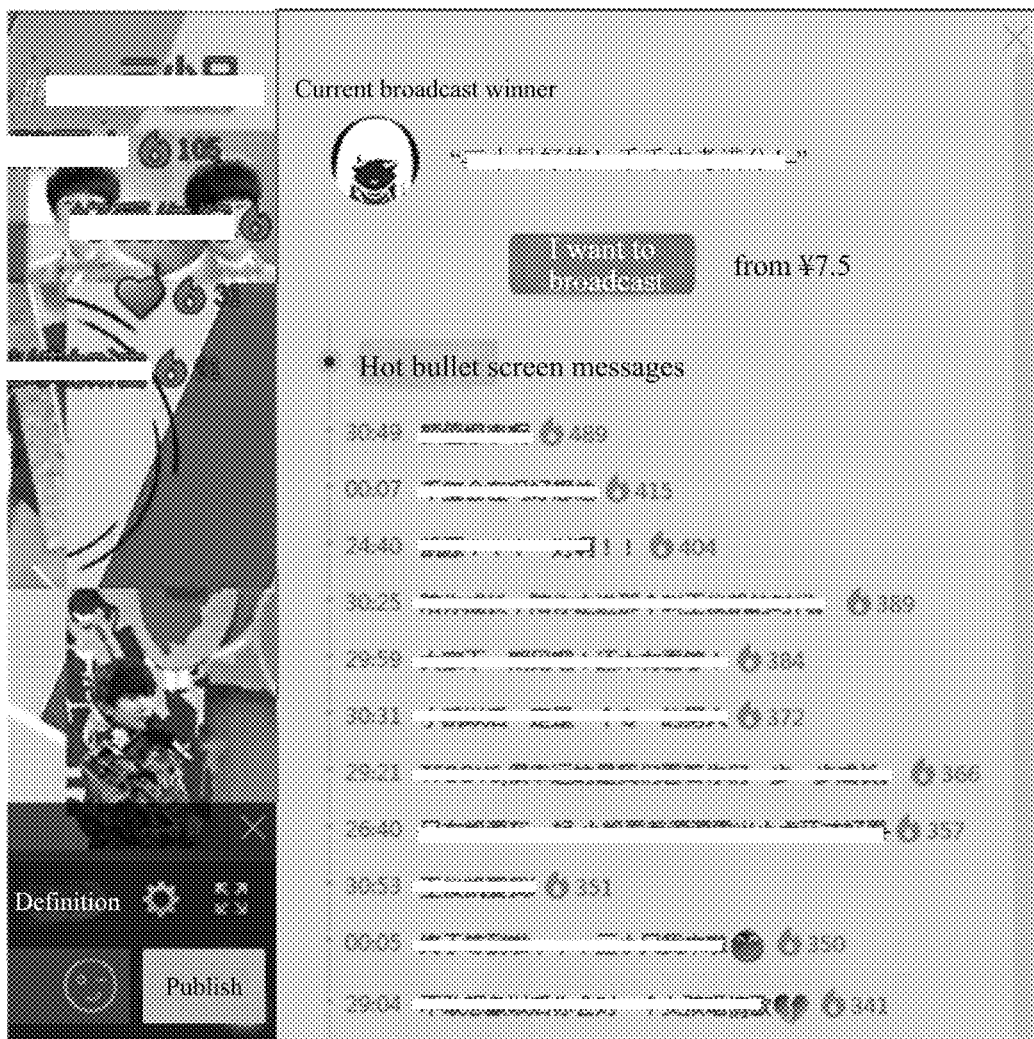

Here, the first input operation may be an input operation for a preset function button, and the preset function button is arranged on a play page of multimedia data (such as video data and audio data) or a play application window. Of course, the preset function button may be arranged on a display page of single media data, and for example, the single media data may be WEB data. FIG. 2a to FIG. 2f are schematic diagrams of application scenarios of a client according to an embodiment of the disclosure. FIG. 2a to FIG. 2f are screen shots, in which contents irrelevant to the present application, such as the nickname, specific bullet screen messages, are overlaid with white blocks. For example, the multimedia data is video data. As shown in FIG. 2a, the play interface of the video data may be a play interface on a WEB, or may be a play interface of an application client (such as a Tencent video application client). Multiple function buttons are arranged on the play interface, where the preset function button is configured to trigger a bullet screen comment function. That is, the client triggers the bullet screen comment function to be enabled when detecting the first input operation for the preset function button. Furthermore, in the embodiment, the client displays an operation interface shown in FIG. 2b based on the first input operation, and the operation interface is an input entry of the first comment information (such as bullet screen comment information) of the embodiment. A user may input the first input information (i.e. bidding information) and the first comment information (such as the bullet screen comment information) based on the operation interface (that is, a triggering button "to broadcast" is clicked), as shown in FIG. 2c and FIG. 2e. Preferably, the client may display second data which is currently pre-stored in the server for the user to input the first input information according to the second data.

In Step 102, the server acquires the first input information and first comment information sent by the client, and identifies the first data in the first input information, the first data indicating a numerical value of money to be paid by the client.

In the embodiment, the first input information is input information sent by the client and including the first data. In the scenario shown in FIG. 2c or FIG. 2d, when the client displays an input interface, the user may input the first data in the input interface, and may input the first data based on the second data which is currently pre-stored in the server. On such a basis, the first data may specifically be indicated by a number, and the number may be an integer as well as a decimal, and is configured to indicate an amount to be paid. The first comment information is the bullet screen comment information acquired by the client, i.e. a bullet screen comment content to be sent by the user through the client. In the embodiment, the server simultaneously acquires the first input information (i.e. the first data) and the first comment information (i.e. the bullet screen comment information), and the server may control the first comment information to be output with the video data in a specific display manner or output with the video data in a default display manner according to a subsequent comparison result. In another implementation, the server may acquire the first input information (i.e. the first data) at first, then acquire the first comment information (i.e. the bullet screen comment information) according to the comparison result and control the first comment information to be output with the video data in the specific display manner.

In Step 103, the server determines that a condition is met if determining that the value of the first data is higher than the value of second pre-stored data and payment based on the first data is successful.

In the embodiment, the second data is pre-stored in the server. In an implementation, when the server does not receive first input information including first data from any client, that is, there is no one participating in bidding, the second data stored in the server is second preconfigured data, and the second data may be any numerical value, and may be, of course, zero. Specifically, as shown in FIG. 2c, when the user inputs the first input information in the input interface of the client, the input interface displays the second data (i.e. the second preconfigured data), and in such a scenario, if the server acquires the first data of which the value is greater than or equal to the second data, the user may participate in bidding. In another implementation, after reception of the first input information including the first data from any client by the server and successful payment based on the first data, it is indicated the client bids successfully, and the first data sent by the client is correspondingly stored in the server as the second stored data, specifically as shown in FIG. 2d. That is, after successful bidding of each round, the server stores the first data bidding successfully for storage, and the first stored data will be adopted as second data for bidding of a next round.

As an implementation, successful payment based on the first data includes that: the server determines successful payment based on the first data after receiving a confirmation message from a third-party payment platform. The confirmation message indicates that the client successfully pays based on the first data through the third-party payment platform.

In the implementation, as shown in FIG. 2c or 2d, when the client inputs the first input information and the first comment information, a "next" virtual button is triggered to enter a payment flow, that is, the client displays a payment interface. In the implementation, the payment interface includes a triggering entry of the third-party payment platform, and the third-party payment platform includes, but not limited to: a bank (deposit card/credit card) payment platform and a third-party payment platform such as Alipay, TenPay and WeChat wallet. The client triggers the triggering entry of the third-party payment platform to establish a connection with the third-party payment platform, and completes a payment operation based on the first data through the third-party payment platform.

As another implementation, successful payment based on the first data includes that: the server receives a payment instruction sent by the client, and controls, based on the payment instruction, a payment platform in the server to successfully pay based on the first data.

In the implementation, as shown in FIG. 2c or FIG. 2d, when the client inputs the first input information and the first comment information, the "next" virtual button is triggered to enter the payment flow, that is, the client displays the payment interface. The first data may indicate the numerical value of the money, or may be a numerical value of virtual money, for example, virtual money like points and QQ coins. Accounts of users corresponding to all clients are managed and maintained in the server, and the accounts include money and/or virtual money. In the implementation, the payment interface includes a triggering entry of a payment platform, and the payment platform includes, but not limited to: a money payment platform (such as WeChat wallet) in the server, and/or, a virtual money payment platform (such as QQ coins). The client triggers the triggering entry of the payment platform to enter the payment flow, so as to complete the payment operation based on the first data.

As an implementation, if determining that the client completes payment based on the first data, the server may send first indication information to the client to notify the client of successful bidding.

In Step 104, the server generates, according to a specific display parameter, second comment information based on the first continent information and controls the second comment information to be Output to the client.

Here, the specific display parameter is different from a display parameter of the first comment information ordinary bullet screen comment information), and the specific display parameter includes at least one of the following parameters: a specific font, a specific font size, a specific color and a specific display background.

In the embodiment, the first comment information indicates first bullet screen comment information (which may be understood as ordinary bullet screen comment information), the second comment information indicates first comment information bidding successfully (i.e. the broadcast bullet screen comment information), display manners for the first comment information and the second comment information are different from each other, that is, the second comment information has the specific display parameter, the first comment information has a default display parameter, and the specific display parameter is different from the default display parameter. For example, the specific display parameter includes at least one of the following parameters: the specific font, the specific font size, the specific color and the specific display background, and the default display parameter includes at least one of the following parameters: a default font, a default font size, a default color and the like. The specific font is different from the default font, the specific font size is larger than the default font size, the specific color is different from the default color, the specific display parameter may have the specific display background (such as a highlighted background), and the default display parameter includes no specific display background.

As an implementation, the server inserts the second comment information into multimedia data. Specifically, if the operation that the client acquires the first input operation in Step 101 includes that the client acquires the first input operation in a process of outputting multimedia data sent by the server, the operation that the second comment information is controlled to be output to the client in this step includes that: the second comment information is controlled to be output to the client along with the multimedia data.

In the implementation, when the client executes an input operation of the first input information and the first comment information in a multimedia data play process, the server controls the second comment information bidding successfully to be output along with the multimedia data. Specifically, a frame data range, into which the server inserts the second comment information, of the multimedia data is from an n1th second to an n2th second, both of n1 and n2 being positive integers. For example, the frame data range, into which the second comment information is inserted, of the multimedia data ranges from a third second to an eighth second, that is, the second comment information is started to be output and displayed from the third second till the eighth second when the multimedia data is played.

As another implementation, the operation that the second comment information is controlled to be output to the client includes that: the second comment information is added to a specific area of a display interface, and the display interface is controlled to be output to the client, where the display interface includes at least one piece of first comment information of which a priority reaches a preset condition. Specifically, the display interface may serve to display hot bullet screen comment information as a display platform for bullet screen comment information, and the hot bullet screen comment information may specifically be bullet screen comment information with relatively more comments, bullet screen comment information receiving relatively more "likes" and the like. In the implementation, the server adds the second comment information to the specific area in the display interface, specifically as shown in FIG. 2e, the specific area is different from an area where other bullet screen comment information is, and the display manner of the second comment information is also different from that of the first comment information (such as the bullet screen comment information), so that the user may read the second comment information in the first place.

In Step 105, the client outputs the second comment information sent by the server, the second comment information being the first comment information displayed in a specific display manner.

Based on the two abovementioned implementations, as another implementation, the operation that the second comment information sent by the server is output in the step includes that: the multimedia data and the second comment information are output, the second comment information being displayed in a specific time range of the multimedia data.

As another implementation, the operation that the second comment information sent by the server is output includes that: a second input operation is detected, and a display interface is output based on the second input operation, the display interface including at least one piece of first comment information of which a priority reaches a preset condition; and the second comment information sent by the server is received, the second comment information being displayed in a specific area of the display interface.

In the step, the display manner of the second comment information (i.e. the broadcast bullet screen comment information) is different, that is, the second comment information has the specific display parameter, and the specific display parameter is different from the default display parameter of the first comment information. For example, the specific display parameter includes at least one of the following parameters: the specific font, the specific font size, the specific color and the specific display background, and the default display parameter includes at least one of the following parameters: the default font, the default font size, the default color and the like. The specific font is different from the default font, the specific font size is larger than the default font size, the specific color is different from the default color, the specific display parameter may have the specific display background (such as the highlighted background), and the default display parameter includes no specific display background. On such a basis, the second comment information presented in the multimedia data received by the client in the specific display manner is visually different from the first comment information presented in the default display manner, and the second comment information is enlarged or highlighted to reflect a difference of a publisher of the broadcast bullet screen comment information and meet a requirement of the publisher.

As an implementation, after the step that the client outputs the second comment information sent by the server, the method further includes the following steps.

The server acquires first input information and first comment information sent by a second client, generates, according to a specific display parameter, new second comment information based on the first comment information to replace the second comment information when determining that the value of first data in the first input information is higher than the value of the first data in the first input information input by the client, and sends indication information to the client, where the indication information indicates that the second comment information is updated with the new second comment information.

The client outputs the indication information sent by the server, where the indication information indicates that the second comment information is updated with the new second comment information of the second client.

Figure 2F:
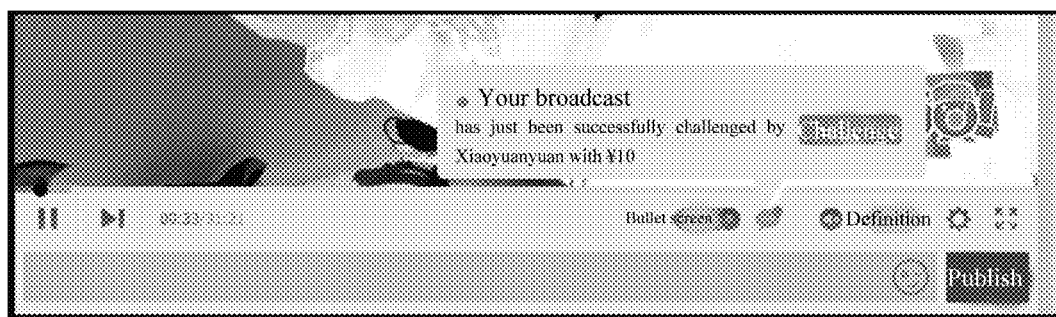

In the embodiment, when there is another client (i.e. the second client) participating in bidding of broadcast bullet screen comment information, the second client executes the operation flow from Step 101 to Step 103 in the embodiment; and if it is determined that the value of the first data of the second client is higher than the value of second pre-stored data (the current second data is the first data stored after successful bidding of the client) and the second client completes payment based on the first data, the server sends the indication information to the client to indicate that a broadcast bullet screen comment published by the user of the client has been replaced with a broadcast bullet screen comment published by the second client, and the indication information may specifically be shown in FIG. 2f.

By the technical solution of the embodiment of the disclosure, a bullet screen comment is selected as a broadcast bullet screen through a bidding mechanism, and the broadcast bullet screen is displayed in the specific display manner. Therefore, on one hand, the broadcast bullet screen is distinguished from other bullet screen comments, comment display manners are enriched, and the broadcast bullet screen is more notable; and on the other hand, a special identity of the user is also highlighted, or partiality of the user for the video data is expressed, or partiality of the user for an object in the video data is expressed, a requirement of the user is met, and user experiences are greatly improved.

Figure 3:
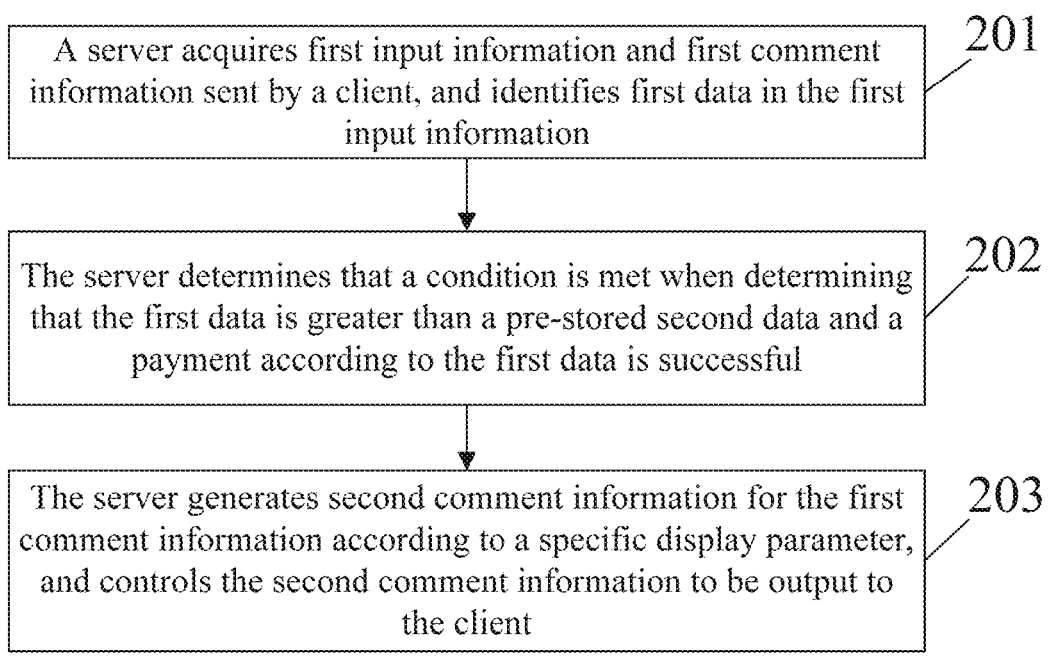
FIG. 3 is a flowchart of an information processing method according to an embodiment of the disclosure.

An embodiment of the disclosure provides an information processing method. FIG. 3 is a flowchart of an information processing method according to the embodiment of the disclosure. As shown in FIG. 3, the method includes the following steps.

In Step 201, a server acquires first input information and first comment information sent by a client, and identifies first data in the first input information, where the first data indicates a numerical value of money to be paid by the client.

In the embodiment, the server may be a home server or server cluster of multimedia data in a practical application, such as a home server or server cluster of a Tencent video client. The server may also be a WEB server or server cluster. For example, a user accesses video data through a QQ browser.

Here, the first input information is input information sent by the client and including the first data. In the scenario shown in FIG. 2c or FIG. 2d, when the client displays an input interface, the user may input the first data in the input interface, and may input the first data based on second data which is currently pre-stored in the server. On such a basis, the first data may specifically be indicated by a number, and the number may be an integer or a decimal, and is used to indicate an amount of money to be paid. The first comment information is bullet screen comment information sent by the client, i.e. a bullet screen comment content to be sent by the user through the client. In the embodiment, the server simultaneously acquires the first input information (i.e. the first data) and the first comment information (i.e. the bullet screen comment information), and the server may control the first comment information to be output with the video data in a specific display manner or output with the video data in a default display manner according to a subsequent comparison result. In another implementation, the server may firstly acquire the first input information (i.e. the first data), then acquire the first comment information (i.e. the bullet screen comment information) according to the comparison result and control the first comment information to be output with the video data in the specific display manner.

In Step 202, the server determines that a condition is met if determining that the value of the first data is higher than the value of second pre-stored data and payment based on the first data is successful.

In the embodiment, the second data is pre-stored in the server. In an implementation, when the server does not receive first input information including first data from any client, that is, there is no one participating in bidding, the second data stored in the server is second preconfigured data, and the second data may be any numerical value, and may be, of course, zero. Specifically, as shown in FIG. 2c, when the user inputs the first input information in the input interface of the client, the input interface displays the second data (i.e. the second preconfigured data), and in such a scenario, the server acquires the first data of which the value is more than or equal to the value of the second data for participation in bidding. In another implementation, after reception of the first input information including the first data from any client by the server and successful payment based on the first data, it is indicated the client bids successfully, and the first data sent by the client is correspondingly stored in the server as the second stored data, specifically as shown in FIG. 2d. That is, after successful bidding of each round, the server stores the first data bidding successfully for storage, and the first stored data will be employed as second data for bidding of a next round. In such a scenario, the server must acquire the first data of which the value is higher than the value of the second data for participation in bidding.

As an implementation, successful payment based on the first data includes that: the server determines successful payment based on the first data after receiving a confirmation message from a third-party payment platform, where the confirmation message indicates that the client pays successfully according to the first data through the third-party payment platform.

In the implementation, as shown in FIG. 2c or 2d, when the client inputs the first input information and the first comment information, a "next" virtual button is triggered to enter a payment flow, that is, the client displays a payment interface. In the implementation, the payment interface includes a triggering entry of the third-party payment platform, and the third-party payment platform includes, but not limited to: a bank (deposit card/credit card) payment platform and a third-party payment platform such as Alipay, TenPay and WeChat wallet. The client triggers the triggering entry of the third-party payment platform to establish a connection with the third-party payment platform, and completes a payment operation based on the first data through the third-party payment platform.

As another implementation, successful payment based on the first data includes that: the server receives a payment instruction sent by the client, and controls, based on the payment instruction, a payment platform in the server to successfully pay based on the first data.

In the implementation, as shown in FIG. 2c or FIG. 2d, when the client inputs the first input information and the first comment information, the "next" virtual button is triggered to enter the payment flow, that is, the client displays the payment interface. The first data may indicate the numerical value of the money, or may be a numerical value of virtual money, for example, virtual money like points and QQ coins. Accounts of users corresponding to all clients are managed and maintained in the server, and the accounts include money and/or virtual money. In the implementation, the payment interface includes a triggering entry of a payment platform, and the payment platform includes, but not limited to: a money payment platform (such as WeChat wallet) in the server, and/or, a virtual money payment platform (such as QQ coins). The client triggers the triggering entry of the payment platform to enter the payment flow to complete the payment operation based on the first data.

As an implementation, the server may send first indication information to the client to notify the client of successful bidding if determining that the client completes payment based on the first data.

In Step 203, the server generates, according to a specific display parameter, second comment information based on the first comment information, and controls the second comment information to be output to the client.

Here, the specific display parameter is different from a display parameter of the first comment information (i.e. ordinary bullet screen comment information), and the specific display parameter includes at least one of the following parameters: a specific font, a specific font size, a specific color and a specific display background.

In the embodiment, the first comment information indicates bullet screen comment information, the second comment information indicates first comment information bidding successfully (i.e. the broadcast bullet screen comment information), display manners of the first comment information and the second comment information are different from each other, that is, the second comment information has the specific display parameter, the first comment information has a default display parameter, and the specific display parameter is different from the default display parameter. For example, the specific display parameter includes at least one of the following parameters: the specific font, the specific font size, the specific color and the specific display background, and the default display parameter includes at least one of the following parameters: a default font, a default font size, a default color and the like. The specific font is different from the default font, the specific font size is larger than the default font size, the specific color is different from the default color, the specific display parameter may have the specific display background (such as a highlighted background), and the default display parameter includes no specific display background.

As an implementation, the server inserts the second comment information into multimedia data. Specifically, when the client executes an input operation of the first input information and the first comment information in a process of outputting the multimedia data sent by the server, the operation that the second comment information is controlled to be output to the client in this step includes that: the second comment information is controlled to be output to the client along with the multimedia data.

In the implementation, when the client executes the input operation of the first input information and the first comment information in a multimedia data play process, the second comment information bidding successfully is controlled to be output along with the multimedia data, Specifically, a frame data range, into which the server inserts the second comment information, of the multimedia data is from an n1th second to an n2th second, where both n1 and n2 are positive integers. For example, the frame data range, into which the second comment information is inserted, of the multimedia data ranges from a third second to an eighth second, that is, the second comment information is started to be output and displayed from the third second till the eighth second when the multimedia data is played.

As another implementation, the operation that the second comment information is controlled to be output to the client includes that: the second comment information is added to a specific area of a display interface, and the display interface is controlled to be output to the client, wherein the display interface includes at least one piece of first comment information of which a priority reaches a preset condition. Specifically, the display interface may serve to display hot bullet screen comment information as a display platform for bullet screen comment information, and the hot bullet screen comment information may specifically be bullet screen comment information with relatively more comments, bullet screen comment information receiving relatively more "likes" and the like. In the implementation, the server adds the second comment information to the specific area in the display interface, specifically as shown in FIG. 2e, the specific area is different from an area where other bullet screen comment information is, and the display manner of the second comment information is also different from the first comment information (such as the bullet screen comment information), so that the user may read the second comment information in the first place.

As an implementation, after the step that the second comment information is controlled to be output to the client, the method further includes that the following steps.

The server acquires first input information and first comment information sent by a second client, generates, according to a specific display parameter, new second comment information based on the first comment information to replace the second comment information when determining that the value of first data in the first input information is higher than the value of the first data in the first input information input by the client, and sends indication information to the client, where the indication information indicates that the second comment information is updated with the new second comment information.

In the embodiment, when there is another client (i.e. the second client) participating in bidding of broadcast bullet screen comment information, the server executes the operation flow from Step 201 to Step 202 in the embodiment; and if it is determined that the value of the first data of the second client is higher than the value of second pre-stored data (the current second data is the first data stored after successful bidding of the client) and the second client completes payment based on the first data, the server sends the indication information to the client to indicate that a broadcast bullet screen comment published by the client has been replaced with a broadcast bullet screen comment published by the second client, and the indication information may specifically be shown in FIG. 2f.

By the technical solution of the embodiment of the disclosure, a bullet screen comment is selected as a broadcast bullet screen through a bidding mechanism, and the broadcast bullet screen is displayed in the specific display manner. Therefore, on one hand, the broadcast bullet screen is distinguished from other bullet screen comments, comment display manners are enriched, and the broadcast bullet screen is more notable; and on the other hand, a special identity of the user is also highlighted, or partiality of the user for the video data is expressed, or partiality of the user for an object in the video data is expressed, a requirement of the user is met, and user experiences are greatly improved.

The embodiment of the disclosure further provides a computer storage medium, in which computer-executable instructions are stored, the computer-executable instructions are configured to execute the information processing method applied in the server in the embodiment of the disclosure.

Figure 4:
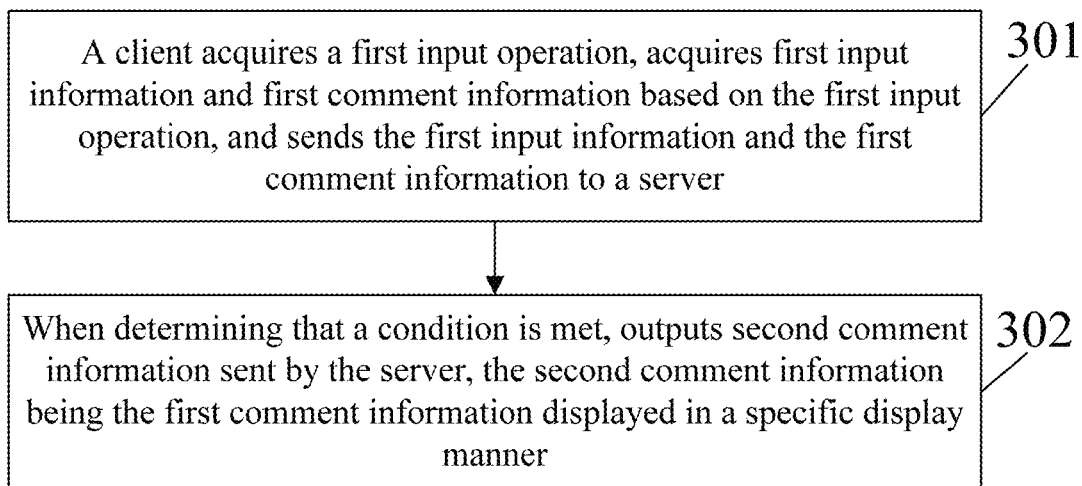
FIG. 4 is a flowchart of an information processing method according to an embodiment of the disclosure.

An embodiment of the disclosure provides an information processing method. FIG. 4 is a flowchart of an information processing method according to the embodiment of the disclosure. As shown in FIG. 4, the method includes the following steps.

In Step 301, a client acquires a first input operation, acquires first input information and first comment information based on the first input operation, and sends the first input information and the first comment information to a server, where the first input information includes first data.

In the embodiment, the information processing method is applied in the client, and the client may specifically be a device such as a Personal Computer (PC) and a mobile phone, wherein the PC may specifically include a desktop computer, a notebook computer, an all-in-one PC and a tablet computer, and the like.

Here, the first input operation may be an input operation for a preset function button, and the preset function button is arranged on a play page of multimedia data (such as video data and audio data) or a play application window. Of course, the preset function button may be arranged on a display page of single media data, and for example, the single media data may be WEB data. For example, the multimedia data is video data. As shown in FIG. 2a, the play interface of the video data may be a play interface on a WEB, or may be a play interface of an application client (such as a Tencent video application client). Multiple function buttons are arranged in the play interface, where the preset function button is configured to trigger a bullet screen comment function. That is, the client triggers the bullet screen comment function to be enabled when detecting the first input operation for the preset function button. Furthermore, in the embodiment, the client displays an operation interface shown in FIG. 2b based on the first input operation, and the operation interface is an input entry of the first comment information (such as bullet screen comment information) of the embodiment. A user may input the first input information (i.e. bidding information) and the first comment information (such as the bullet screen comment information) based on the operation interface (that is, a triggering button "to broadcast" is clicked), as shown in FIG. 2c and FIG. 2c. Preferably, the client may display second data which is currently pre-stored in the server for the user to input the first input information according to the second data.

In Step 302, if it is determined that a condition is met, second comment information sent by the server is output, where the second comment information is the first comment information displayed in a specific display manner.

Here, the operation that it is determined that the condition is met includes that: it is determined that the condition is met if determining that the value of the first data is higher than the value of the second data pre-stored in the server and payment based on the first data is successful.

Specifically, the second data is pre-stored in the server. In an implementation, when the server does not receive first input information including first data from any client, that is, there is no one participating in bidding, the second data stored in the server is second preconfigured data, and the second data may be any numerical value, and may be, of course, zero. Specifically, as shown in FIG. 2c, when the user inputs the first input information in an input interface of the client, the input interface displays the second data (i.e. the second preconfigured data), and in such a scenario, the server acquires the first data of which the value is greater than or equal to the value of the second data for participation in bidding. In another implementation, after reception of the first input information including the first data from any client by the server and successful payment based on the first data, it is indicated the client bids successfully, and the first data sent by the client is correspondingly stored in the server as the second stored data, specifically as shown in FIG. 2d. That is, after successful bidding of each round, the server stores the first data bidding successfully for storage, and the first stored data will be employed as second data for bidding of a next round.

As an implementation, successful payment based on the first data includes that: the server determines successful payment based on the first data after receiving a confirmation message from a third-party payment platform, where the confirmation message indicates that the client successfully pays based on the first data through the third-party payment platform.

In the implementation, as shown in FIG. 2c or 2d, when the client inputs the first input information and the first comment information, a "next" virtual button is triggered to enter a payment flow, that is, the client displays a payment interface. In the implementation, the payment interface includes a triggering entry of the third-party payment platform, and the third-party payment platform includes, but not limited to: a bank (deposit card/credit card) payment platform and a third-party payment platform such as Alipay, TenPay and WeChat wallet. The client triggers the triggering entry of the third-party payment platform to establish a connection with the third-party payment platform, and completes a payment operation based on the first data through the third-party payment platform.

As another implementation, successful payment based on the first data includes that: the server receives a payment instruction sent by the client, and controls, based on the payment instruction, a payment platform in the server to successfully pay based on the first data.

In the implementation, as shown in FIG. 2c or FIG. 2d, when the client inputs the first input information and the first comment information, the "next" virtual button is triggered to enter the payment flow, that is, the client displays the payment interface. The first data may indicate a numerical value of money, or may be a numerical value of virtual money, for example, virtual money like points and QQ coins. Accounts of users corresponding to all clients are managed and maintained in the server, and the accounts include money and/or virtual money. In the implementation, the payment interface includes a triggering entry of a payment platform, and the payment platform includes, but not limited to: a money payment platform (such as WeChat wallet) in the server, and/or, a virtual money payment platform (such as QQ coins). The client triggers the triggering entry of the payment platform to enter the payment flow to complete the payment operation based on the first data.

As an implementation, if determining that the client completes payment based on the first data, the server may send first indication information to the client to notify the client of successful bidding.

As an implementation, the operation that the client acquires the first input operation in Step 301 includes that: the client acquires the first input operation in a process of outputting multimedia data sent by the server; and the operation that the second comment information sent by the server is output in this step correspondingly includes that: the multimedia data and the second comment information are output, where the second comment information is displayed in a specific time range of the multimedia data.

In the implementation, when the client executes an input operation of the first input information and the first comment information in a multimedia data play process, the second comment information bidding successfully is controlled to be output along with the multimedia data. Specifically, a frame data range, into which the server inserts the second comment information, of the multimedia data is from an n1th second to an n2th second, where both n1 and n2 are positive integers. For example, the frame data range, into which the second comment information is inserted, of the multimedia data ranges from a third second to an eighth second, that is, the second comment information is started to be output and displayed from the third second till the eighth second when the multimedia data is played.

As another implementation, the operation that the second comment information sent by the server is output includes that: a second input operation is detected, and a display interface is output based on the second input operation, where the display interface includes at least one piece of first comment information of which a priority reaches a preset condition; and the second comment information sent by the server is received, and the second comment information is displayed in a specific area of the display interface.

Specifically, the display interface may serve to display hot bullet screen comment information as a display platform for bullet screen comment information, and the hot bullet screen comment information may specifically be bullet screen comment information with relatively more comments, bullet screen comment information receiving relatively more "likes" and the like. In the implementation, the server adds the second comment information to the specific area in the display interface, specifically as shown in FIG. 2e, the specific area is different from an area where other bullet screen comment information is, and the display manner of the second comment information is also different from the first comment information such as the bullet screen comment information), so that the user may read the second comment information in the first place.

In the embodiment, the display manner of the second comment information (i.e. the broadcast bullet screen comment information) is different, that is, the second comment information has a specific display parameter, and the specific display parameter is different from a default display parameter of the first comment information. For example, the specific display parameter includes at least one of the following parameters: a specific font, a specific font size, a specific color and a specific display background, and the default display parameter includes at least one of the following parameters: a default font, a default font size, a default color and the like. The specific font is different from the default font, the specific font size is larger than the default font size, the specific color is different from the default color, the specific display parameter may have a specific display background (such as a highlighted background), and the default display parameter includes no specific display background. On such a basis, the second comment information presented in the multimedia data received by the client in the specific display manner is visually different from the first comment information presented in a default display manner, and the second comment information is enlarged or highlighted to reflect a difference of a publisher of the broadcast bullet screen comment information and meet a requirement of the publisher.

As an implementation, after the step that the client outputs the second comment information sent by the server, the method further includes that: indication information sent by the server is output, where the indication information indicates that the second comment information is updated with new second comment information of a second client.

In the embodiment, when there is another client (i.e. the second client) participating in bidding of broadcast bullet screen comment information, the second client executes the operation flow of Step 301 in the embodiment; and if it is determined that the value of first data of the second client is higher than the value of second pre-stored data (the current second data is the first data stored after successful bidding of the client) and the second client completes payment based on the first data, the server sends the indication information to the client to indicate that a broadcast bullet screen comment published by the user of the client has been replaced with a broadcast bullet screen comment published by the second client, and the indication information may specifically be shown in FIG. 2f.

By the technical solution of the embodiment of the disclosure, a bullet screen comment is selected as a broadcast bullet screen through a bidding mechanism, and the broadcast bullet screen is displayed in the specific display manner. Therefore, on one hand, the broadcast bullet screen is distinguished from other bullet screen comments, comment display manners are enriched, and the broadcast bullet screen is more notable; and on the other hand, a specific identity of the user is also highlighted, or partiality of the user for the video data is expressed, or partiality of the user for an object in the video data is expressed, a requirement of the user is met, and user experiences are greatly improved.

The embodiment of the disclosure further provides a computer storage medium, in which computer-executable instructions are stored, where the computer-executable instructions are configured to execute the information processing method applied in the client in the embodiment of the disclosure.

Figure 5:
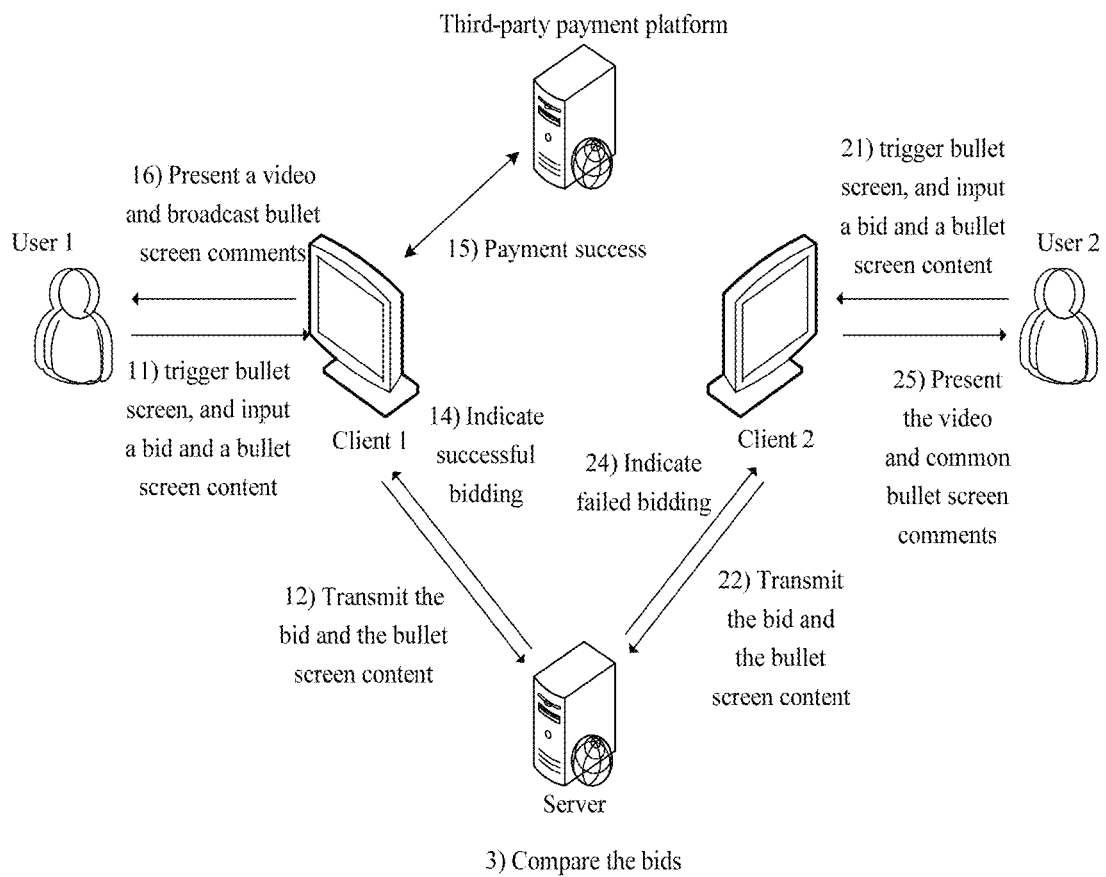
FIG. 5 is a schematic diagram of an application scenario of an information processing method according to an embodiment of the disclosure.

Based on the embodiments described above, FIG. 5 is a schematic diagram of an application scenario of an information processing method according to an embodiment of the disclosure. As shown in FIG. 5, the information processing method may be applied to the application scenario shown in the figure. A server may establish connection with multiple clients, for example, there are only two clients in the example, the two clients are a client 1 and a client 2 respectively, the client 1 is operated by a user 1, and the client 2 is operated by a user 2.

Specifically, in Step 11, the user 1 triggers a bullet screen function and inputs first data (a bid) and first comment information (bullet screen comment information) through the client 1. In Step 21, the user 2 triggers the bullet screen function and inputs first data (a bid) and first comment information (bullet screen comment information) through the client 2. Specifically, Step 11 and Step 21 may both trigger the bullet screen function and input the first data and the first comment information, as shown in FIG. 2a to FIG. 2d.

In Step 12, the client 1 transmits the first data (the bid) and the first comment information (the bullet screen comment information) to the server. Correspondingly, Step 22: the client 2 transmits the first data (the bid) and the first comment information (the bullet screen comment information) to the server.

In Step 13, the server compares the received two pieces of first data. Specifically, when the received first data is first data received for the first time, the server compares the first data with second preconfigured data (which may be understood as base price data), and indicates that the corresponding client bids successfully if determining that the first data reaches the second preconfigured data (that is, the value of the first data is greater than or equal to the value the second data). When the received first data is not the first data received for the first time, for example, the first data sent by the client 1 and the client 2 is almost received at the same time, the server compares the first data of the client 1 and the first data of the client 2 with the second preconfigured data respectively on one hand, and further compares the first data of the client 1 with the first data of the client 2 to obtain the relatively higher-value first data if determining that both the values of the first data of the client 1 and the first data of the client 2 are higher than the value of the second data. For example, the value of the first data of the client 1 is relatively higher. Then, Step 14 and Step 24 are executed.

In Step 14, the server indicates that the client 1 bids successfully. Correspondingly, in Step 24, the server indicates that the client 2 fails in the bid. On such a basis, the client 1 is required to execute a payment operation and further execute Step 15. In the example, payment may be performed through a third-party payment platform, and a confirmation message is sent to the server after successful payment. The client 2 fails in the bid, and thus does not need to enter a payment flow.

In Step 15, the client 1 presents a video and a broadcast bullet screen comment, that is, an input bullet screen content is displayed in a specific display manner. Correspondingly, in Step 25, the client 2 presents the video and an ordinary bullet screen comment, that is, an input bullet screen content is displayed in a default display manner.

Figure 6:
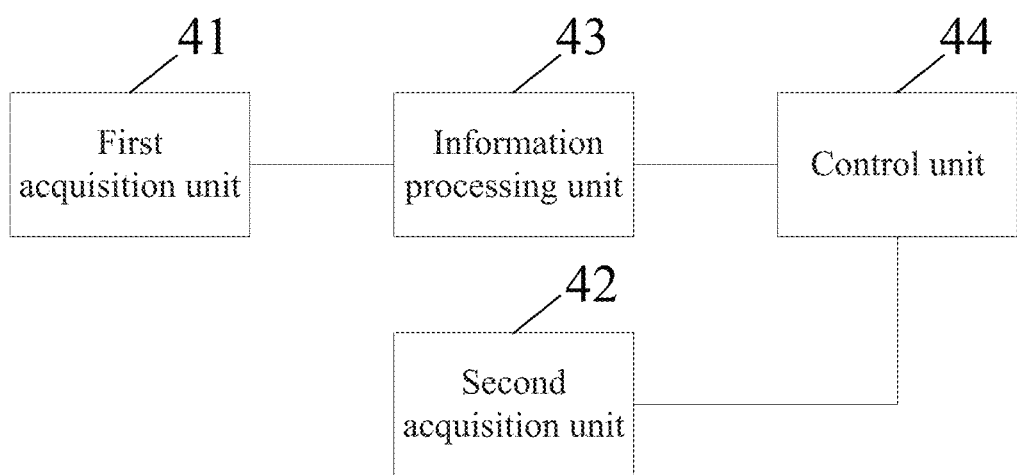
FIG. 6 is a structure diagram of a server according to an embodiment of the disclosure.

An embodiment of the disclosure provides a server. FIG. 6 is a structure diagram of a server according to the embodiment of the disclosure. As shown in FIG. 6, the server includes: a first acquisition unit 41, a second acquisition unit 42, an information processing unit 43 and a control unit 44.

The first acquisition unit 41 is configured to acquire first input information sent by a client.

The second acquisition unit 42 is configured to acquire first comment information sent by the client.

The information processing unit 43 is configured to identify first data in the first input information acquired by the first acquisition unit 41, and determine that a condition is met if determining that the first data is higher than second pre-stored data and payment based on the first data is successful.

The control unit 44 is configured to, if the information processing unit 43 determines that the condition is met, generate, according to a specific display parameter, second comment information based on the first comment information, and control the second comment information to be output to the client.

In the embodiment, the server may be a home server or server cluster of multimedia data in a practical application, such as a home server or server cluster of a Tencent video client. The server may also be a WEB server or server cluster. For example, a user accesses video data through a QQ browser.

Here, the first input information is input information sent by the client and including the first data. In the scenario shown in FIG. 2c or FIG. 2d, when the client displays an input interface, the user may input the first data in the input interface, and may input the first data based on second data which is currently pre-stored in the server. On such a basis, the first data may specifically be indicated by a number, and the number may be an integer or a decimal, and is configured to indicate an amount to be paid. The first comment information is bullet screen comment information sent by the client, i.e. a bullet screen comment content to be sent by the user through the client. In the embodiment, the first acquisition unit 41 and the second acquisition unit 42 may simultaneously acquire the first input information (i.e. the first data) and the first comment information (i.e. the bullet screen comment information) respectively, and the information processing unit 43 may control the first comment information to be output with the video data in a specific display manner or output with the video data in a default display manner according to a subsequent comparison result. In another implementation, the first acquisition unit 41 may firstly acquire the first input information (i.e. the first data)t, then the second acquisition unit 42 is triggered to acquire the first comment information (i.e. the bullet screen comment information) according to the comparison result, and the control unit 44 controls the first comment information to be output with the video data in the specific display manner.

In the embodiment, the second data is pre-stored in the server. In an implementation, when the first acquisition unit 41 does not receive first input information including first data from any client, that is, there is no one participating in bidding, the second pre-stored data is second data preconfigured in the server, and the second data may be any numerical value, and may be, of course, zero. Specifically, as shown in FIG. 2c, when the user inputs the first input information in the input interface of the client, the input interface displays the second data (i.e. the second preconfigured data), and in such a scenario, the server acquires the first data of which the value is greater than or equal to the value of the second data for participation in bidding. In another implementation, after reception of the first input information including the first data from any client by the server and successful payment based on the first data, it is indicated the client bids successfully, and the first data sent by the client is correspondingly stored in the server as the second stored data, specifically as shown in FIG. 2d. That is, after successful bidding of each round, the server stores the first data bidding successfully for storage, and the first stored data will be employed as second data for bidding of a next round. In such a scenario, the server acquires the first data of which the value is higher than the value of the second data for participation in bidding.

Specifically, the control unit 44 is configured to determine successful payment based on the first data after receiving a confirmation message from a third-party payment platform, where the confirmation message indicates that the client successfully pays based on the first data through the third-party payment platform; or, the control unit 44 is configured to receive a payment instruction sent by the client, and control, based on the payment instruction, a payment platform in the server to successfully pay based on the first data.

As the first implementation, as shown in FIG. 2c or 2d, when the client inputs the first input information and the first comment information, a "next" virtual button is triggered to enter a payment flow, that is, the client displays a payment interface. In the implementation, the payment interface includes a triggering entry of the third-party payment platform, and the third-party payment platform includes, but not limited to: a bank (deposit card/credit card) payment platform and a third-party payment platform such as Alipay, TenPay and WeChat wallet. The client triggers the triggering entry of the third-party payment platform to establish connection with the third-party payment platform, and completes a payment operation based on the first data through the third-party payment platform.

As the second implementation, as shown in FIG. 2c or FIG. 2d, when the client inputs the first input information and the first comment information, the "next" virtual button is triggered to enter the payment flow, that is, the client displays the payment interface. Here, the first data may indicate a numerical value of money, or may be a numerical value of virtual money, for example, virtual money like points and QQ coins. Accounts of users corresponding to all clients are managed and maintained in the server, and the accounts include money and/or virtual money. In the implementation, the payment interface includes a triggering entry of a payment platform, and the payment platform includes, but not limited to: a money payment platform (such as WeChat wallet) in the server, and/or, a virtual money payment platform (such as QQ coins). The client triggers the triggering entry of the payment platform to enter the payment flow to complete the payment operation based on the first data.

Specifically, the specific display parameter is different from a display parameter of the first comment information (i.e. ordinary bullet screen comment information), and the specific display parameter includes at least one of the following parameters: a specific font, a specific font size, a specific color and a specific display background.

In the embodiment, the first comment information indicates bullet screen comment information, the second comment information indicates first comment information bidding successfully (i.e. broadcast bullet screen comment information), display manners of the first comment information and the second comment information are different from each other, that is, the second comment information has the specific display parameter, the first comment information has a default display parameter, and the specific display parameter is different from the default display parameter. For example, the specific display parameter includes at least one of the following parameters: the specific font, the specific font size, the specific color and the specific display background, and the default display parameter includes at least one of the following parameters: a default font, a default font size, a default color and the like. The specific font is different from the default font, the specific font size is larger than the default font size, the specific color is different from the default color, the specific display parameter may have the specific display background (such as a highlighted background), and the default display parameter includes no specific display background.

Specifically, the control unit 44 is configured to control the second comment information to be output to the client along with the multimedia data; or, the control unit 44 is configured to add the second comment information to a specific area of a display interface, and control the display interface to be output to the client, the display interface includes at least one piece of first comment information of which a priority reaches a preset condition.

As the first implementation, when the client executes an input operation of the first input information and the first comment information in a multimedia data play process, the control unit 44 controls the second comment information bidding successfully to be output along with the multimedia data. Specifically, a frame data range, into which the control unit 44 inserts the second comment information, of the multimedia data is from an n1th second to an n2th second, where both n1 and n2 are positive integers. For example, the frame data range, into which the second comment information is inserted, of the multimedia data ranges from a third second to an eighth second, that is, the second comment information is started to be output and displayed from the third second till the eighth second when the multimedia data is played.

As the second implementation, specifically, the display interface may serve to display hot bullet screen comment information as a display platform for bullet screen comment information, and the hot bullet screen comment information may specifically be bullet screen comment information with relatively more comments, bullet screen comment information receiving relatively more "likes" and the like. In the implementation, the control unit 44 adds the second comment information to the specific area in the display interface, specifically as shown in FIG. 2e, the specific area is different from an area where other bullet screen comment information is, and the display manner of the second comment information is also different from the first comment information (such as the bullet screen comment information), so that the user may read the second comment information in the first place.

As an implementation, the first acquisition unit 41 is further configured to acquire first input information sent by a second client.

The second acquisition unit 42 is further configured to acquire first comment information sent by the second client.

The information processing unit 43 is further configured to generate, according to a specific display parameter, new second comment information based on the first comment information to replace the second comment information when determining that the value of first data in the first input information is higher than the value of the first data in the first input information input by the client, and send indication information to the client, where the indication information indicates that the second comment information is updated with the new second comment information.

In the embodiment, when there is another client (i.e. the second client) participating in bidding of broadcast bullet screen comment information, the server executes the abovementioned operation flow of the embodiment; and if it is determined that the value of the first data of the second client is higher than the value of second pre-stored data (the current second data is the first data stored after successful bidding of the client) and the second client completes payment based on the first data, the control unit 44 sends the indication information to the client to indicate that a broadcast bullet screen comment published by the client has been replaced with a broadcast bullet screen comment published by the second client, and the indication information may specifically be shown in FIG. 2f.

Those skilled in the art should know that functions of each processing module in the server of the embodiment of the disclosure may be understood with reference to related descriptions in the abovementioned information processing method, and each processing module in an information processing system of the embodiment of the disclosure may be implemented through analogue circuits which realize the functions in the embodiment of the disclosure, and may also be implemented by running software which realizes the functions in the embodiment of the disclosure in an intelligent terminal.

In the embodiment, all of the first acquisition unit 41, second acquisition unit 42, information processing unit 43 and control unit 44 in the server may be implemented by a Central Processing Unit (CPU), Digital Signal Processor (DSP) or Field-Programmable Gate Array (FPGA) in the server in combination with a transmission interface (which is specifically a transceiver antenna) during a practical application.

Figure 7:
FIG. 7 is a structure diagram of a client according to an embodiment of the disclosure.

An embodiment of the disclosure further provides a client. FIG. 7 is a structure diagram of a client according to the embodiment of the disclosure. As shown in FIG. 7, the client includes: an input unit 51 and an output unit 52.

The input unit 51 is configured to acquire a first input operation, acquire first input information and first comment information based on the first input operation, and send the first input information and the first comment information to a server, the first input information including first data.

The output unit 52 is configured to, if it is determined that a condition is met, output second comment information sent by the server, the second comment information being the first comment information displayed in a specific display manner.

In the embodiment, such an information processing method is applied in the client, and the client may specifically be a device such as a PC and a mobile phone, and the PC may specifically include a desktop computer, a notebook computer, an all-in-one PC, a tablet computer and the like.

Here, the first input operation may be an input operation for a preset function button, and the preset function button is arranged on a play page of multimedia data (such as video data and audio data) or a play application window. Of course, the preset function button may be arranged in a display page of single media data, and for example, the single media data may be WEB data. For example, the multimedia data is video data. As shown in FIG. 2a, the play interface of the video data may be a play interface on a WEB, or may be a play interface of an application client (such as a Tencent video application client). Multiple function buttons are arranged on the play interface, where the preset function button is configured to trigger a bullet screen comment function. That is, the client triggers the bullet screen comment function to be enabled when detecting the first input operation for the preset function button. Furthermore, in the embodiment, the client displays an operation interface shown in FIG. 2b based on the first input operation, and the operation interface is an input entry of the first comment information (such as bullet screen comment information) of the embodiment. A user may input the first input information (i.e. bidding information) and the first comment information (such as the bullet screen comment information) based on the operation interface (that is, a triggering button "to broadcast" is clicked), as shown in FIG. 2c and FIG. 2c. Preferably, the client may display second data which is currently pre-stored in the server for the user to input the first input information according to the second data.

Specifically, the operation that it is determined that the condition is met includes that: it is determined that the condition is met if determining that the value of the first data is higher than the value of the second data pre-stored in the server and payment based on the first data is successful.

Specifically, the second data is pre-stored in the server. In an implementation, when the server does not receive first input information including first data from any client, that is, there is no one participating in bidding, the second data stored in the server is second preconfigured data, and the second data may be any numerical value, and may be, of course, zero. Specifically, as shown in FIG. 2c, when the user inputs the first input information in an input interface of the client, the input interface displays the second data (i.e. the second preconfigured data), and in such a scenario, the server acquires the first data of which the value is greater than or equal to the value of the second data for participation in bidding. In another implementation, after reception of the first input information including the first data from any client by the server and successful payment based on the first data, it is indicated the client bids successfully, and the first data sent by the client is correspondingly stored in the server as the second stored data, specifically as shown in FIG. 2d. That is, after successful bidding of each round, the server stores the first data bidding successfully for storage, and the first stored data will be employed as second data for bidding of a next round.

As an implementation, successful payment based on the first data includes that: the server determines successful payment based on the first data after receiving a confirmation message from a third-party payment platform, the confirmation message indicating that the client successfully pays based on the first data through the third-party payment platform.

In the implementation, as shown in FIG. 2c or 2d, when the input unit 51 inputs the first input information and the first comment information, a "next" virtual button is triggered to enter a payment flow, that is, the client displays a payment interface. In the implementation, the payment interface includes a triggering entry of the third-party payment platform, and the third-party payment platform includes, but not limited to: a bank (deposit card/credit card) payment platform and a third-party payment platform such as Alipay, TenPay and WeChat wallet. The client triggers the triggering entry of the third-party payment platform to establish connection with the third-party payment platform, and completes a payment operation based on the first data through the third-party payment platform.

As another implementation, successful payment based on the first data includes that: the server receives a payment instruction sent by the client, and controls, based on the payment instruction, a payment platform in the server to successfully pay based on the first data.

In the implementation, as shown in FIG. 2c or FIG. 2d, when the input unit 51 inputs the first input information and the first comment information, the "next" virtual button is triggered to enter the payment flow, that is, the client displays the payment interface. Here, the first data may indicate a numerical value of money, or may be a numerical value of virtual money, for example, virtual money like points and QQ coins. Accounts of users corresponding to all clients are managed and maintained in the server, and the accounts include money and/or virtual money. In the implementation, the payment interface includes a triggering entry of a payment platform, and the payment platform includes, but not limited to: a money payment platform (such as WeChat wallet) in the server, and/or, a virtual money payment platform (such as QQ coins). The client triggers the triggering entry of the payment platform to enter the payment flow to complete the payment operation based on the first data.

As an implementation, the server sends first indication information to the client to notify the client of successful bidding if determining that the client completes payment based on the first data.

As an implementation, the input unit 51 is configured to acquire the first input operation in a process of outputting multimedia data sent by the server by the output unit; and the output unit 52 is configured to output the multimedia data and second comment information sent by the server, where the second comment information is displayed in a specific time range of the multimedia data.

In the implementation, when the input unit 51 executes an input operation of the first input information and the first comment information in a multimedia data play process, the output unit 52 is controlled to output the second comment information bidding successfully along with the multimedia data. Specifically, a frame data range, into which the server inserts the second comment information, of the multimedia data is from an n1th second to an n2th second, where both n1 and n2 are positive integers. For example, the frame data range, into which the second comment information is inserted, of the multimedia data ranges from a third second to an eighth second, that is, the output unit 52 starts outputting and displaying the second comment information from the third second till the eighth second when the multimedia data is played.

Specifically, a display interface may serve to display hot bullet screen comment information as a display platform for bullet screen comment information, and the hot bullet screen comment information may specifically be bullet screen comment information with relatively more comments, bullet screen comment information receiving relatively more "likes" and the like. In the implementation, the server adds the second comment information to a specific area in the display interface, specifically as shown in FIG. 2e, the specific area is different from an area where other bullet screen comment information is, and a display manner of the second comment information is also different from the first comment information (such as the bullet screen comment information), so that the user may read the second comment information in the first place.

In the embodiment, the display manner of the second comment information (i.e. the broadcast bullet screen comment information) is different, that is, the second comment information has a specific display parameter, and the specific display parameter is different from a default display parameter of the first comment information. For example, the specific display parameter includes at least one of the following parameters: a specific font, a specific font size, a specific color and a specific display background, and the default display parameter includes at least one of the following parameters: a default font, a default font size, a default color and the like. The specific font is different from the default font, the specific font size is larger than the default font size, the specific color is different from the default color, the specific display parameter may have a specific display background (such as a highlighted background), and the default display parameter includes no specific display background. On such a basis, the second comment information presented in the multimedia data received by the client in the specific display manner is visually different from the first comment information presented in a default display manner, and the second comment information is enlarged or highlighted to reflect a difference of a publisher of the broadcast bullet screen comment information and meet a requirement of the publisher.

As an implementation, the output unit 52 is configured to, after the input unit detects a second input operation, output a display interface based on the second input operation, where the display interface includes at least one piece of first comment information of which a priority reaches a preset condition; receive the second comment information sent by the server, and display the second comment information in a specific area of the display interface.

Furthermore, the output unit 52 is further configured to output indication information sent by the server, where the indication information indicates that the second comment information is updated with new second comment information of a second client.

In the embodiment, when there is another client (i.e. the second client) participating in bidding of broadcast bullet screen comment information, the second client executes the operation flow of Step 301 in the embodiment; and if it is determined that the value of first data of the second client is higher than the value of second pre-stored data (the current second data is the first data stored after successful bidding of the client) and the second client completes payment based on the first data, the server sends the indication information to the client to indicate that a broadcast bullet screen comment published by the user of the client has been replaced with a broadcast bullet screen comment published by the second client, and the indication information may specifically be shown in FIG. 2f.

Those skilled in the art should know that functions of each processing module in the client of the embodiment of the disclosure may be understood with reference to related descriptions in the abovementioned information processing method, and each processing module in the client of the embodiment of the disclosure may be implemented through analogue circuits which realize the functions in the embodiment of the disclosure, and may also be implemented by running software which realizes the functions in the embodiment of the disclosure on an intelligent terminal.

In the embodiment, the input unit 51 in the client may be implemented by a CPU, DSP or FPGA in the client during a practical application; and the output unit 52 in the client may be implemented through a transmission interface or transceiver antenna in the client during the practical application.

Figure 8:
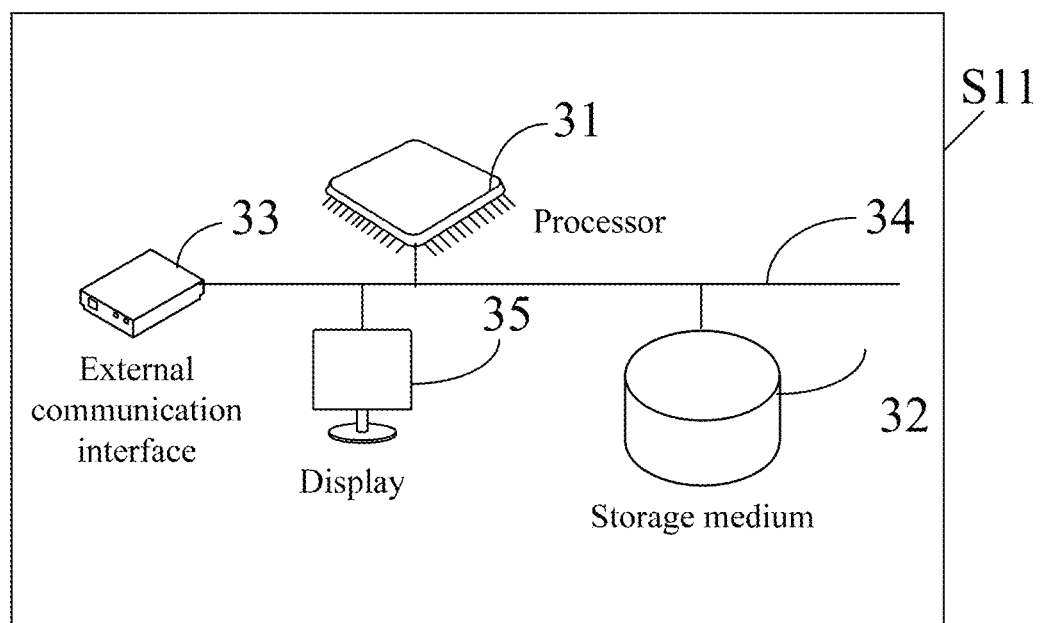
FIG. 8 is a hardware structure diagram of a client according to an embodiment of the disclosure.

FIG. 8 is a hardware structure diagram of a client according to an embodiment of the disclosure. An example of the client serving as a hardware entity is shown in FIG. 8. The client S11 includes a processor 31, a storage medium 32, a display 35 and at least one external communication interface 33. The processor 31, the storage medium 32, the display 35 and the external communication interface 33 are all connected through a bus 34, and the bus 34 is configured to transmit data among the processor 31, the storage medium 32, the display 35 and the external communication interface 33.

In some embodiments provided by the disclosure, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the above-mentioned method embodiment; and the storage medium includes: various media capable of storing program codes such as mobile storage equipment, a Read-Only Memory (ROM), a Random Access Memory (RAM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a PC, a server, network equipment or the like) to execute all or part of the method in each embodiment of the disclosure. The abovementioned storage medium includes: various media capable of storing program codes such as mobile storage equipment, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

According to the embodiments of the disclosure, a piece of bullet screen comment information is selected as broadcast bullet screen comment information through a bidding mechanism, and the broadcast bullet screen comment information is displayed in a specific display manner. Therefore, on one hand, the broadcast bullet screen comment information is distinguished from other bullet screen comment information, comment display manners are enriched, and the information is more notable; and on the other hand, a special identity of a user is highlighted, a requirement of the user is met, and user experiences are greatly improved.

The invention claimed is:

1. An information processing method, applied in a first terminal, the method comprising:
    displaying ordinary comment information on a video image with a default display parameter;
    acquiring a first input operation;
    acquiring first input information and first comment information based on the first input operation;
    sending the first input information and the first comment information to a server, the first input information comprising first data; and
    in response to a value of the first data being higher than a value of second data pre-stored in the server and payment based on the first data being successful;
    outputting second comment information sent by the server, the second comment information being the first comment information displayed in a specific display manner with a specific display parameter comprising at least one of a specific font, a specific font size, a specific color and a specific display background, the specific display parameter being different from the default display parameter, so that the second comment information and the ordinary comment information are displayed simultaneously, and the second comment information is displayed with a more outstanding visual effect compared with the ordinary comment information, and
    outputting indication information sent by the server, wherein the indication information indicates that the second comment information from the first terminal is replaced with new second comment information from a second terminal.

2. The method according to claim 1, wherein the acquiring a first input operation comprises: acquiring the first input operation in a process of outputting multimedia data sent by the server; and
    wherein the outputting second comment information sent by the server comprises:
    outputting the multimedia data and the second comment information, the second comment information being displayed in a specific time range of the multimedia data.

3. The method according to claim 1, wherein the outputting second comment information sent by the server comprises:
    upon detection of a second input operation, outputting a display interface based on the second input operation, the display interface comprising at least one piece of first comment information of which a priority reaches a preset condition; and
    receiving the second comment information sent by the server; and displaying the second comment information in a specific area of the display interface.

4. An information processing method, applied in a server, the method comprising:
controlling ordinary comment information generated with a default display parameter to be output to at least one terminal including a first terminal;
acquiring first input information and first comment information sent by the first terminal;
identifying first data in the first input information;
determining that a condition is met if determining that a value of the first data is higher than a value of second pre-stored data and payment based on the first data is successful;
generating, according to a specific display parameter comprising at least one of a specific font, a specific font size, a specific color and a specific display background, the specific display parameter being different from the default display parameter, second comment information based on the first comment information, so that the second comment information and the ordinary comment information displayed simultaneously, and the second comment information is displayed with a more outstanding visual effect compared with the ordinary comment information;
controlling the second comment information to be output to at least one terminal including the first terminal;
acquiring third input information and third comment information sent by a second terminal:
in response to a value of third data in the third input information being higher than the value of the first data in the first input information input by the first terminal, generating, according to a specific display parameter, fourth comment information based on the third comment information to replace the second comment information; and
sending indication information to the at least one terminal, wherein the indication information indicates that the second comment information is updated with the fourth comment information.

5. The method according to claim 4, wherein the determining that payment based on the first data is successful comprises:
determining that the payment based on the first data is successful, after the server receives a confirmation message from a third-party payment platform, wherein the confirmation message indicates that the first terminal successfully pays based on the first data through the third-party payment platform; or
receiving a payment instruction sent by the first terminal, and controlling, based on the payment instruction, a payment platform in the server to successfully pay based on the first data.

6. The method according to claim 4, wherein the controlling the second comment information to be output to at least one terminal including the first terminal comprises:
controlling the second comment information to be output to the at least one terminal along with multimedia data; or,
adding the second comment information to a specific area of a display interface, and controlling the display interface to be output to the at least one terminal, wherein the display interface comprises at least one piece of first comment information of which a priority reaches a preset condition.

7. A first terminal, comprising:
a processor; and
a memory storing instructions, which, when executed by the processor, cause the processor to perform an information processing method, the method comprising:
displaying ordinary comment information on a video image with a default display parameter;
acquiring a first input operation;
acquiring first input information and first comment information based on the first input operation;
sending the first input information and the first comment information to a server, the first input information comprising first data; and
in response to a value of the first data being higher than a value of second data pre-stored in the server and payment based on the first data being successful;
outputting second comment information sent by the server, the second comment information being the first comment information displayed in a specific display manner with a specific display parameter comprising at least one of a specific font, a specific font size, a specific color and a specific display background, the specific display parameter being different from the default display parameter, so that the second comment information and the ordinary comment information displayed simultaneously, and the second comment information is displayed with a more outstanding visual effect compared with the ordinary comment information, and
outputting indication information sent by the server, wherein the indication information indicates that the second comment information from the first terminal is replaced with new second comment information from a second terminal.

8. The first terminal according to claim 7, wherein the acquiring a first input operation comprises: acquiring the first input operation in a process of outputting multimedia data sent by the server; and
wherein the outputting second comment information sent by the server comprises:
outputting the multimedia data and the second comment information, the second comment information being displayed in a specific time range of the multimedia data.

9. The first terminal according to claim 7, wherein the outputting second comment information sent by the server comprises:
upon detection of a second input operation, outputting a display interface based on the second input operation, the display interface comprising at least one piece of first comment information of which a priority reaches a preset condition; and
receiving the second comment information sent by the server; and
displaying the second comment information in a specific area of the display interface.

10. A server, comprising:
a processor; and
a memory, storing instructions, which, when executed by the processor, cause the processor to perform an information processing method, the method comprising:
controlling ordinary comment information generated with a default display parameter to be output to at least one terminal including a first terminal;
acquiring first input information and first comment information sent by the first terminal;
identifying first data in the first input information;

determining that a condition is met if determining that a value of the first data is higher than a value of second pre-stored data and payment based on the first data is successful;

generating, according to a specific display parameter comprising at least one of a specific font, a specific font size, a specific color and a specific display background, the specific display parameter being different from the default display parameter, second comment information based on the first comment information, so that the second comment information and the ordinary comment information displayed simultaneously, and the second comment information is displayed with a more outstanding visual effect compared with the ordinary comment information;

controlling the second comment information to be output to at least one terminal including the first terminal;

acquiring third input information and third comment information sent by a second terminal:

in response to a value of third data in the third input information being higher than the value of the first data in the first input information input by the first terminal, generating, according to a specific display parameter, fourth comment information based on the third comment information to replace the second comment information; and sending indication information to the at least one terminal, wherein the indication information indicates that the second comment information is updated with the fourth comment information.

11. The server according to claim 10, wherein the determining that payment based on the first data is successful comprises:

determining that the payment based on the first data is successful, after the server receives a confirmation message from a third-party payment platform, wherein the confirmation message indicates that the first terminal successfully pays based on the first data through the third-party payment platform; or receiving a payment instruction sent by the first terminal, and controlling, based on the payment instruction, a payment platform in the server to successfully pay based on the first data.

12. The server according to claim 10, wherein the controlling the second comment information to be output to at least one terminal including the first terminal comprises:

controlling the second comment information to be output to the at least one terminal along with multimedia data; or, adding the second comment information to a specific area of a display interface, and controlling the display interface to be output to the at least one terminal, wherein the display interface comprises at least one piece of first comment information of which a priority reaches a preset condition.

* * * * *